United States Patent [19]
Aubrecht

[11] Patent Number: 5,860,786
[45] Date of Patent: Jan. 19, 1999

[54] SPARE TIRE HOLDER HAVING A SLIDABLE SUPPORT SHELF

[76] Inventor: Steven R. Aubrecht, 1219 A. S. Springs St., Independence, Mo. 64055

[21] Appl. No.: 40,607

[22] Filed: Mar. 18, 1998

[51] Int. Cl.[6] .................................................. B62D 43/04
[52] U.S. Cl. ................... 414/463; 224/42.21; 224/42.23
[58] Field of Search ............................. 224/42.12, 42.21, 224/42.23; 414/498, 522, 463, 465, 466

[56] References Cited

U.S. PATENT DOCUMENTS

| | | | |
|---|---|---|---|
| 4,047,629 | 9/1977 | Klein ........................................ | 414/463 |
| 4,095,709 | 6/1978 | Eller ........................................ | 414/466 |
| 4,174,797 | 11/1979 | Yasue et al. ......................... | 414/463 X |
| 4,312,620 | 1/1982 | Muschalek, Jr. .................. | 224/42.12 X |
| 4,428,513 | 1/1984 | Delmastro ............................. | 224/42.21 |
| 4,522,325 | 6/1985 | McMillan .............................. | 224/42.21 |
| 4,884,729 | 12/1989 | Barkouskie ........................... | 224/42.21 |
| 5,076,629 | 12/1991 | Peters et al. ....................... | 224/42.12 X |
| 5,197,641 | 3/1993 | Montgomery, Jr. ................ | 224/42.021 |
| 5,238,358 | 8/1993 | Higgins et al. ........................ | 414/463 |
| 5,297,913 | 3/1994 | Au .......................................... | 414/463 |
| 5,531,558 | 7/1996 | Ruesher ................................. | 414/463 |

*Primary Examiner*—Janice L. Krizek
*Attorney, Agent, or Firm*—Joseph N. Breaux

[57] ABSTRACT

A spare tire holder which lowers at least the rearward end of a slidable support shelf via first and second rear telescopic vertical support members wherein the slidable support shelf includes a handle which when pulled slides the slidable support shelf from under the vehicle through two parallel spaced channel rail guides.

15 Claims, 2 Drawing Sheets

SPARE TIRE HOLDER HAVING A SLIDABLE SUPPORT SHELF

TECHNICAL FIELD

The present invention relates to spare tire holders and, more particularly, to a spare tire holder which lowers at least the rearward end of a slidable support shelf wherein the slidable support shelf includes a handle which when pulled slides the slidable support shelf from under the vehicle.

BACKGROUND OF THE INVENTION

Spare tire carriers which store a spare tire to the underside of a truck or van is known. The spare tire carriers either lower the tire to the ground or pivot the rearward end of the carrier downward. The biggest challenge to accessing the spare tire is the ability of the driver to reach under the vehicle to pull the lowered tire from under the vehicle. In some instances, the driver must lie on the ground to reach the tire from under the vehicle. This can present a problem if the driver has a back problem or is elderly. The retrieval of the spare tire from under the vehicle is further complicated by the weight of the tire.

Several devices have been patented which are aimed at spare tire holders.

U.S. Pat. No. 5,531,558, to Ruescher, entitled "SPARE TIRE LIFTING DEVICE" discloses a device which assists in lowering and raising the spare tire on a vehicle. The device consists of a winch operated by a ratchet assembly to wind or unwind a strap to raise or lower the spare tire relative to a stored position. The device is installed by a strap and hook assembly on the rear bumper or on the bumper support bracket by an integral hanger.

U.S. Pat No. 5,297,913, to Au, entitled "SPARE TIRE HOIST AND CARRIER" discloses an undercarriage spare tire carrier wherein the tire is lifted by a lever arm. A cable is provided wherein one end of the cable is connected to the center of the tire rim by means of a clip. The cable is threaded over a pulley and is connected on an end of the lever arm.

U.S. Pat. No. 5,197,641, to Montgomery, Jr., entitled "SPARE TIRE CARRIER APPARATUS" discloses a spring rod having an upper end and a Lower end with the upper end being connected to the vehicle via a mounting assembly. A cradle bar having a forward end attached to the Lower end of the spring rod is received in a cradle receiver member to form a telescoping cradle.

U.S. Pat. No. 4,884,729, to Barkouskie, entitled "SPARE WHEEL CARRIER" discloses a tire rack having brackets mounted on the frame of the truck which support a rod and arms for pivotal motion between a storage position and a release position. When the tire is moved to the release position a worm gear is rotated to pivot a sector gear on the rod.

U.S. Pat. No. 4,522,325, to McMillan, entitled "DEVICE FOR RAISING AND LOWERING A SPARE TIRE" discloses a device for raising and lowering a spare tire via an actuating lever pivotally attached to the vehicle's rear bumper, and a cable coupling the actuating lever to the truck's spare tire cross strap. The cross strap raises and lowers the spare tire as the actuating lever is pivoted away from and towards the bumper, respectively.

U.S. Pat. No. 4,428,513, to Delmastro, entitled "SPARE WHEEL CARRIER" discloses a spare wheel carrier which includes a dished support having a generally octagonal shape. The rear end of the dished support provides pivot support to lower the rearward end closest to the bumper. Members are provided with lugs to provide an extendable and retractable strut which releasably supports the rearward end of the dished support.

While each of the above spare tire holders function as desired, none of them disclose a spare tire holder which lowers at least the rearward end of a slidable support shelf wherein the slidable support shelf includes a handle which when pulled slides the slidable support shelf from under the vehicle.

As will be seen more fully below, the present invention is substantially different in structure, methodology and approach from that of the prior spare tire holders.

SUMMARY OF THE INVENTION

The preferred embodiment of the spare tire holder of the present invention solves the aforementioned problems in a straight forward and simple manner. What is provided is a spare tire holder which lowers at least the rearward end of a slidable support shelf wherein the slidable support shelf includes a handle which when pulled slides the slidable support shelf from under the vehicle.

The spare tire holder of the present invention comprises:
a frame support structure adapted to be secured to an underside of a vehicle wherein said frame support structure comprises:
first and second rear telescopic vertical support members in parallel spaced relation,
first and second front vertical support members in parallel spaced relation,
a first channel rail guide coupled to said first rear telescopic vertical support member and said first front vertical support member,
a second channel rail coupled to said second rear telescopic vertical support member and said second front vertical support member wherein the first and second channel rail guides are in parallel spaced relation;
a slidable support shelf for securing thereto a spare tire wherein said slidable support shelf is slidably coupled in said first and second channel rail guides;
first and second rear lowering cables journalled through and secured to a bottom end of said first rear telescopic vertical support member and said second rear telescopic vertical support member, respectively; and,
a crank assembly having a shaft having wound therearound said first and second rear lowering cables wherein when said shaft is rotated in a first direction said first and second rear lowering cables are unwound to telescopingly lower said first and second rear telescopic vertical support members, simultaneously, to lower a rear end of said slidable support shelf.

The first and second front vertical support members of the present invention are telescopic. The spare tire holder further comprises first and second front lowering cables journalled through and secured to a bottom end of said first front telescopic vertical support member and said second front telescopic vertical support member, respectively, and wherein said first and second front lowering cables are wound around said shaft wherein when said shaft is rotated in said first direction said first and second front lowering cables and said first and second rear lowering cables are unwound to telescopingly lower said first and second front telescopic vertical support members and said first and second rear telescopic vertical support members, simultaneously, to lower said slidable support shelf.

In view of the above, an object of the present invention is to provide a slidable support shelf with a rearwardly disposed handle easily accessible when the slidable support shelf is in its lowered position wherein when the slidable support shelf is in such lowered position, the wheels are capable of rolling out of the first and second channel rails and onto the ground.

A further object of the present invention is to provide front and rear telescopic vertical support members which are capable of being lowered substantially to the ground. The telescopic feature of the front and rear telescopic vertical support members not only allow the length of such vertical support members to extend to lower the slidable support shelf to the ground but additionally serves to accommodate for varying distance from the underside of the vehicle to the ground. Furthermore, the telescopic feature of the telescopic vertical support members allows the length of such vertical support members to be collapsed to raise the spare tire closely to the underside of the vehicle. The telescopic feature of the telescopic vertical support members also allows the spare tire holder to accommodate varying widths of the spare tire such that the spare tire can be raised sufficiently close to the underside of the vehicle without regard to the width of the spare tire.

It is a still further object of the present invention to provide a spare tire holder which allows the spare tire supported by a slidable support shelf to easily slide rearwardly from under the vehicle. Moreover, the spare tire is easily slid frontward under the vehicle into position so that the spare tire can be raised to the underside of the vehicle.

It is a still further object of the present invention to provide a spare tire holder which includes a crank assembly wherein the crank assembly winds the front lowering cables and the rear lowering cables simultaneously to raise the slidable support shelf and unwinds the lowering cables simultaneously to lower the slidable support shelf.

It is a still further object of the present invention to provide the slidable support shelf with a planar surface having a length which is longer than the diameter of the spare tire so that the frontward disposed wheels do not have to be fully pulled out of first and second channel rail guides. Nevertheless, if desired, the at least four wheels are capable of rolling out of first and second channel rail guides to enable the operator to roll the spare tire to the front of the vehicle.

The above and other objects of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
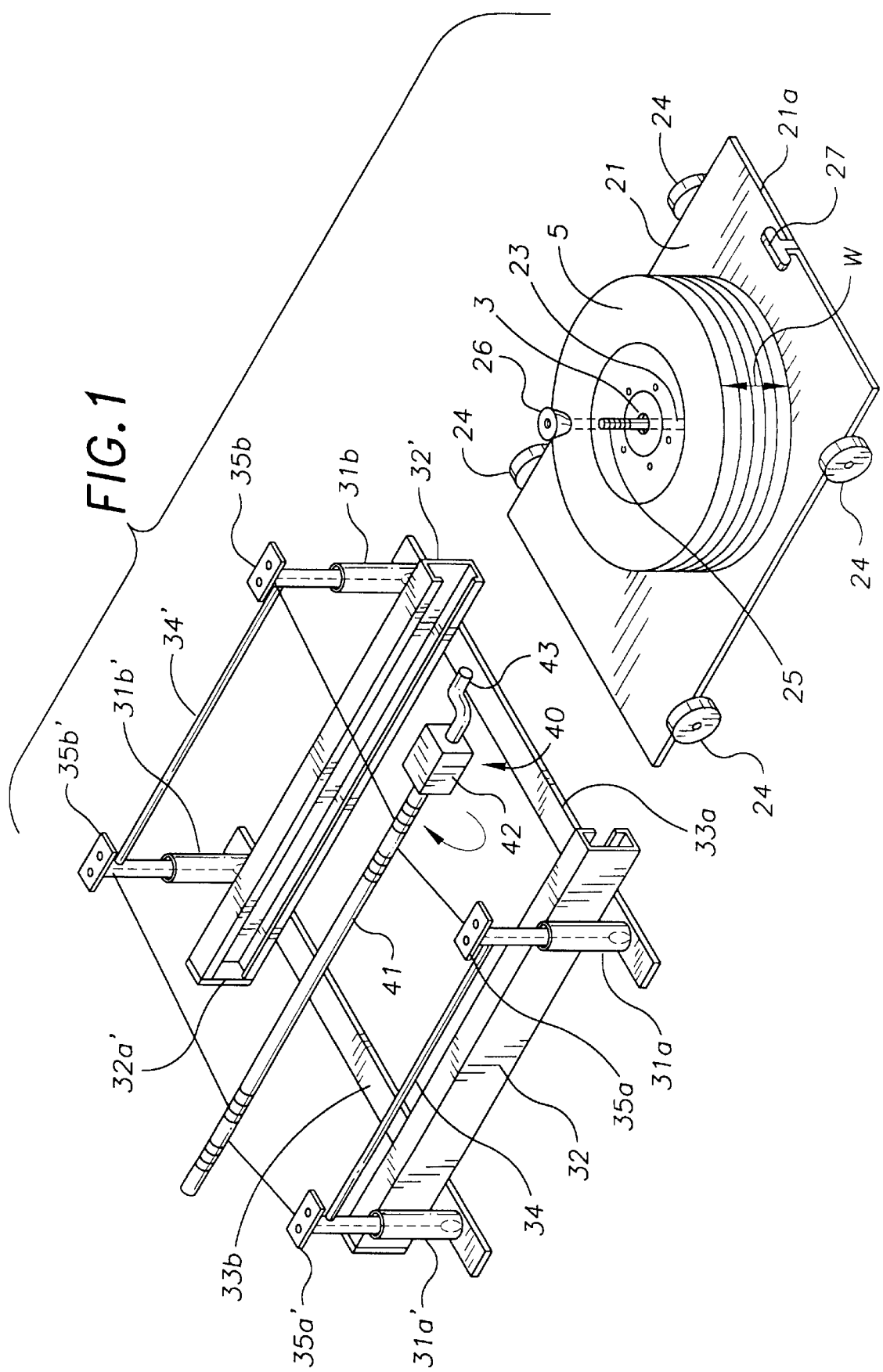
FIG. 1 illustrates a perspective view of the preferred embodiment of the spare tire holder of the present invention with the slidable support shelf rearwardly positioned out of the channel rail guides.
Figure 2:
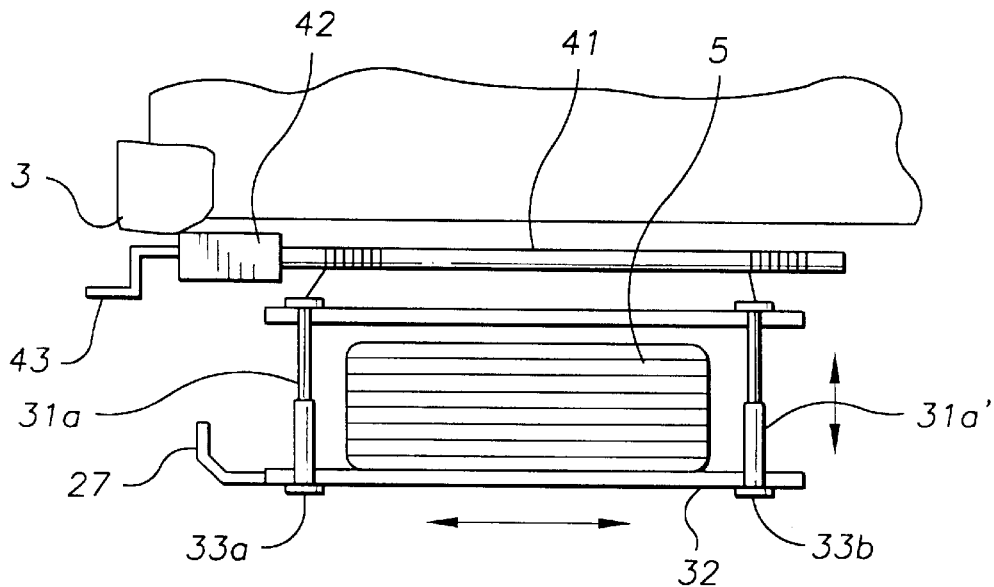
FIG. 2 illustrates a side of the spare tire holder coupled to the underside of the rear off the vehicle.

Referring now to the drawings, and in particular FIG. 1, the spare tire holder of the present invention is designated generally by the numeral 10. Spare tire holder 10 is comprised of slidable support shelf 20, frame support structure 30, crank assembly 40, first and second front lowering cables 50a and 50b and first and second rear lowering cables 50a' and 50b'.

Frame support structure 30 comprises first and second front telescopic vertical support members 31a and 31b in parallel spaced relation, first and second rear telescopic vertical support members 31a' and 31b' in parallel spaced relation, a first channel rail guide 32 coupled to first rear telescopic vertical support member 31a' and first front telescopic vertical support member 31a, a second channel rail guide 32' coupled to second rear telescopic vertical support member 31b' and second front telescopic vertical support member 31b wherein the first and second channel rail guides 32 and 32' are in parallel spaced relation along the horizontal plane.

Frame support structure 30 further comprises front and rear horizontal support members 33a and 33b coupled perpendicular to the lower end of first and second front telescopic vertical support members 31a and 31b, and first and second rear telescopic vertical support members 31a' and 31b', respectively, a first upper horizontal support member 34 coupled to the upper end of first rear telescopic vertical support member 31a' and first front telescopic vertical support member 31a, a second upper horizontal support member 34' coupled to second rear telescopic vertical support member 31b' and second front telescopic vertical support member 31b'. First and second upper horizontal support members 34 and 34' are in parallel spaced relation along the horizontal plane.

Frame support structure 30 further comprises a plurality of support bracket 35a, 35b, 35a' and 35b' wherein a respective one of the support brackets is coupled to the upper distal end of first and second front telescopic vertical support members 31a and 31b and first and second rear telescopic vertical support members 31a' and 31b'.

Figure 4:
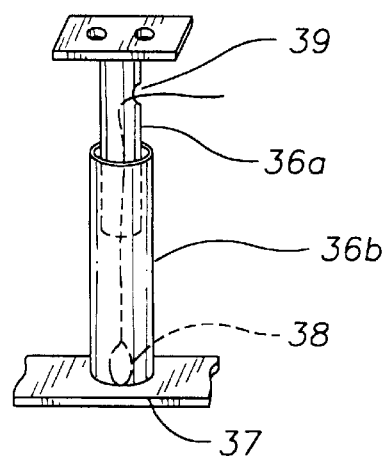
FIG. 4 illustrates a view of the telescopic vertical support member.

Referring now to FIG. 4, since first and second front vertical telescopic support members 31a and 31b and first and second rear vertical telescopic support members 31a' and 31b' are essentially identical only one such telescopic support member will be described in detail. First front vertical telescopic support member 31a comprises upper tubular member 36a and lower tubular member 36b which are telescopingly engaged to extend downward so that the length of first front vertical telescopic support member 31a extends substantially to the ground. The bottom distal end of lower tubular member 36b of first front telescopic vertical support members 31a is closed via bottom surface 37. The interior side of bottom surfaces 37 has coupled thereto eyelet 38 for fixedly securing thereto one end of first front lowering cable 50a. The bottom end of lower tubular member 36b of first front telescopic vertical support member 31a has fixedly coupled thereto a front end of first channel rail guide 32.

The top end of upper tubular member 36a of first front telescopic rear vertical support member 31a has formed therein aperture 39 for journalling therethrough front lowering cable 50a to eyelet 38.

The telescopic feature of the front and rear telescopic vertical support members 31a, 31a', 31b and 31b' not only allows the length of such vertical support members to lower the slidable support shelf 20 to the ground but additionally serves to accommodate for varying distance from the underside of the vehicle to the ground. Furthermore, the telescopic feature of the telescopic vertical support members allows the length of such vertical support members to be collapsed to raise spare tire 5 closely to the underside of the vehicle. The telescopic feature of the telescopic vertical support members also allows spare tire holder 10 to accommodate varying widths of spare tire 5 such that spare tire 5 can be raised sufficiently close to the underside of the vehicle without regard to the width W of spare tire 5.

Referring again to FIG. 1, since first and second channel rail guides 32 and 32' are identical only one such channel rail guide will be described in detail. Second channel rail guide 32' is essentially C-shaped wherein the opening to the channel rail guide is oriented toward the center of frame support structure 30. The front end of second channel rail guide 32' is closed via wall 32a' to prevent wheels 24 slidably received in the opening from sliding out through the front end of the second channel rail guide 32'. Furthermore, the rear end preferably includes a removable locking pin, sliding plate or other means for obstructing, slidable support shelf 20 from sliding out through the rear end of second channel rail guide 32'. Thereby, while the vehicle is driven, the slidable support shelf 20 will not slide out of the first and second channel rail guides 32 and 32'.

Slidable support shelf 20 comprises planar surface 21, tire securing means 23, at least four wheels 24, and handle 27. The at least four wheels 24 allow slidable support shelf 20 to slide within first and second channel rail guides 32 and 32'. Tire securing means 23 is coupled in the center of planar surface 21 for removably mounting spare tire 5 to planar surface 21.

Tire securing means 23 comprises threaded shaft 25 perpendicularly coupled in the center of planar surface 21 and locking member 26 which is threadingly received on threaded shaft 25. The diameter of the upper portion of locking member 26 is greater than the diameter of rim bore 3 of spare tire 5. The top portion of locking member 26 has aperture 26a formed therein so that tire securing means 23 is capable of securing to planar surface 21 spare tires 5 of varying widths W. As can be appreciated, tire securing means 23 functions to secure spare tire 5 such that spare tire 5 is not susceptible to significant movement while the vehicle is moving.

The rear edge 21a of planar surface 21 has fixedly coupled thereto handle 27. Handle 27 extends upward so the operator can easily grasp handle 27 and pull slidable support shelf 20 rearwardly from under the vehicle. In the preferred embodiment, the length of planar surface 21 is longer than the diameter of spare tire 5 so that the frontwardly disposed wheels do not have to be fully pulled out of first and second channel rail guides 32 and 32'. Nevertheless, if desired, the at least four wheels 24 are capable of rolling out of first and second channel rail guides 32 and 32' would enable the operator to roll the spare tire 5 to the front of the vehicle via the slidable support shelf 20.

Figure 3:
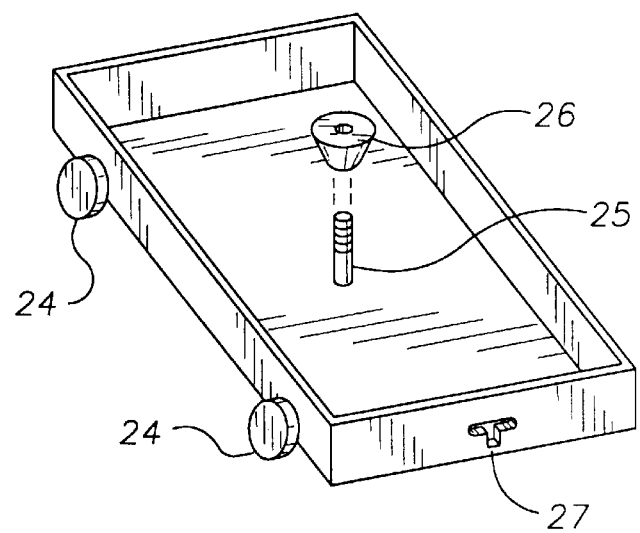
FIG. 3 illustrates an alternate embodiment of the present invention wherein the slidable support shelf is substituted with a slidable draw.

An alternative embodiment of the present invention is shown in FIG. 3. In lieu of slidable support shelf 20, a slidable draw 20' having four vertically upright enclosing walls and a bottom planar surface may be substituted. The height of the vertically upright enclosing walls preferably is less than the width of spare tire 5.

Crank assembly 40 comprises shaft 41, connector box 42, and removable crank handle 43. Shaft 41 is parallelly aligned with the underside of the vehicle via at least one U-shaped bracket (not shown) which allows shaft 41 to rotate therein.

Shaft 41 has a rear end rotatably coupled in connector box 42 and the other end extends frontward. Removable crank handle 43 is coupled to shaft 41 via connector box 42 wherein when removable crank handle 43 is rotated clockwise the length of first and second front lowering cables 50a and 50b and first and second rear lowering cables 50a' and 50b' is extended simultaneously. The gravitational forces acting on lower tubular members 36b extends the length of first and second front telescopic vertical support members 31a and 31b and first and second rear telescopic vertical support members 31a' and 31b', simultaneously, to lower the slidable support shelf 20 or, alternately, slidable draw 20'. Connector box 42 is coupled to the underside of the vehicle in close proximity to the bumper 3.

First and second front lowering cables 50a and 50b are journalled in first and second front telescopic vertical support members 31a and 31b, respectively, wherein first front lowering cable 50a is wound around shaft 41 in a counter clockwise direction and second front lowering cable 50b is wound around shaft 41 in a clockwise direction. Thereby, as shaft 41 is rotated in the clockwise direction, the length of first and second front lowering cables 50a and 50b is extended to lower lower tubular members 36b of first and second front telescopic vertical support members 31a and 31b, respectively. Likewise, first and second rear lowering cables 50a' and 50b' are journalled in first and second rear telescopic vertical support members 31a' and 31b', respectively, wherein first rear lowering cable 50a" is wound around shaft 41 in a counter clockwise direction and second rear lowering cable 50b' is wound around shaft 41 in a clockwise direction. Thereby, as shaft 41 is rotated in the clockwise direction, the length of first and second rear lowering cables 50b and 50b' is extended to lower lower tubular members 36b of first and second rear telescopic vertical support members 31a' and 31b', respectively.

In operation, as removable crank handle 43 is rotated clockwise, shaft 41 rotates clockwise. Thereby, the length of first and second front lowering cables 50a and 50b and first and second rear lowering cables 50a' and 50b' is extended. Henceforth, gravitational forces acting on spare tire 5 and lower tubular members 36b of first and second front telescopic vertical support members 31a and 31b and first and second rear telescopic vertical support members 31a' and 31b' telescopingly slides lower tubular members 36b downward substantially to the ground. Thereafter, the operator applies a force to pull handle 27 rearwardly. Thereby, slidable support shelf 20 slides (rolls) out of channel rail guides 32 and 32' via wheels 24. Slidable support shelf 20 may be fully slid out of first and second channel rail guides 32 and 32' or the frontwardly disposed wheels 24 of slidable support shelf 20 may remain coupled in first and second channel rail guides 32 and 32'.

Spare tire 5 is removed from planar surface 21 by unscrewing locking member 26 of tire securing means 23. Thereafter, spare tire 5 can be placed on the vehicle.

When securing spare tire 5 to the underside of the vehicle, spare tire 5 is secured to planar surface 21 via tire securing means 23. Thereafter, slidable support shelf 20 is slid fully into first and second channel rail guides 32 and 32'. Removable crank handle 43 is then rotated counter clockwise. As removable crank handle 43 is rotated counter clockwise, shaft 41 is rotated counter clockwise to wind first and second front lowering cables 50a and 50b and first and second rear Lowering cables 50a' and 50b', simultaneously. Thereby, lower tubular members 36b of the first second front telescopic vertical support members 36a and 31b and first and second rear telescopic vertical support members 31a' and 31b' are telescopingly slid in their respective upper tubular members 36a. Henceforth, slidable support shelf 20 is raised toward the underside of the vehicle.

In general, crank assembly 40 winds the front lowering cables 50a and 50b and the rear lowering cables 50a' and 50b' simultaneously to raise slidable support shelf 20 and unwinds the front lowering cables 50a and 50b and the rear lowering cables 50a' and 50b', simultaneously, to lower slidable support shelf 20 via removable crank handle 43.

In an alternative embodiment, first and second front vertical support members 31a and 31b are replaced with vertical support members having a fired length and which are pivotally coupled to the front end of first and second channel rail guides 32 and 32', respectively. Thereby, when first and second rear vertical support members 31a' and 31b' are lowered via first and second rear lowering cables 50a' and 50b', respectively, first and second channel rail guides 32 and 32' pivot simultaneously downwardly via gravitational forces.

It is noted that the embodiment of the spare tire holder described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A spare tire holder comprising:
    a frame support structure adapted to be secured to an underside of a vehicle wherein said frame support structure comprises:
        first and second rear telescopic vertical support members in parallel spaced relation,
        first and second front vertical support members in parallel spaced relation,
        a first channel rail guide coupled to said first rear telescopic vertical support member and said first front vertical support member,
        a second channel rail guide coupled to said second rear telescopic vertical support member and said second front vertical support member wherein the first and second channel rail guides are in parallel spaced relation;
    a slidable support shelf for securing thereto a spare tire wherein said slidable support shelf is slidably coupled in said first and second channel rail guides;
    first and second rear lowering cables journalled through and secured to a bottom end of said first rear telescopic vertical support member and said second rear telescopic vertical support member, respectively; and,
    a crank assembly having a shaft having wound therearound said first and second rear lowering cables wherein when said shaft is rotated in a first direction said first and second rear lowering cables are unwound to telescopingly lower said first and second rear telescopic vertical support members, simultaneously, to lower a rear end of said slidable support shelf.

2. The spare tire holder of claim 1, wherein said first and second front vertical support members are telescopic and further comprising first and second front lowering cables journalled through and secured to a bottom end of said first front telescopic vertical support member and said second front telescopic vertical support member, respectively, and wherein said first and second front lowering cables are wound around said shaft wherein when said shaft is rotated in said first direction said first and second front lowering cables and said first and second rear lowering cables are unwound to telescopingly lower said first and second front telescopic vertical support members and said first and second rear telescopic vertical support members, simultaneously, to lower said slidable support shelf.

3. The spare tire holder of claim 2, wherein said first front lowering cable and said first rear lowering cable are wound around said shaft in a counter clockwise direction and said second front lowering cable and said second rear lowering cable are wound around said shaft in a clockwise direction wherein, as said shaft is rotated in the clockwise direction, the length of said first and second front lowering cables and said first and second rear lowering cables are unwound and, when said shaft is rotated in the counter clockwise direction, the length of said first and second front lowering cables and said first and second rear lowering cables are wound around said shaft.

4. The spare tire holder of claim 2, wherein each of said first and second front telescopic vertical support members and said first and second rear telescopic vertical support members each comprises:
    an upper tubular member couplable to an underside of the vehicle and having an aperture formed in a top end;
    a lower tubular member which is telescopingly engaged to said upper tubular member wherein a bottom end of said lower tubular member has coupled thereto a bottom surface; and,
    an eyelet coupled to an interior side of said bottom surface wherein the eyelet of said first front vertical telescopic support member has coupled thereto said first front lowering cable, the eyelet of said second front vertical telescopic support member has coupled thereto said second front lowering cable, the eyelet of said first rear vertical telescopic support member has coupled thereto said first rear lowering cable, and the eyelet of said second rear vertical telescopic support member has coupled thereto said second rear lowering cable.

5. The spare tire holder of claim 1, wherein said slidable support shelf comprises:
    a planar surface aligned in a horizontal plane,
    a means for securing the spare tire;
    at least four wheels coupled to an outer perimeter of said planar surface and which are slidably coupled in said first and second channel rail guides; and,
    a handle coupled to a rear edge of said planar surface.

6. The snare tire holder of claim 5, wherein said tire securing means comprises:
    a threaded shaft perpendicularly coupled in the center of said planar surface; and,
    a locking member which is threadingly received on said threaded shaft wherein a diameter of an upper portion of said locking member is greater than a diameter of a rim bore of the spare tire.

7. The spare tire holder of claim 2, wherein said frame support structure further comprises:
    a front lower horizontal support member coupled perpendicularly to a lower end of said first and second front telescopic vertical support members;
    a rear lower horizontal support member coupled perpendicularly to a lower end of said first and second rear telescopic vertical support members;
    a first upper horizontal support member coupled to an upper end of said first rear telescopic vertical support member and said first front telescopic vertical support member; and, a second upper horizontal support member coupled to said second rear telescopic vertical support member and said second front telescopic vertical support member wherein said first and second upper horizontal support members are parallel spaced relation along a horizontal plane.

8. The spare tire holder of claim 2, wherein said frame support structure further comprises a plurality of support brackets wherein a respective one of the plurality of support brackets is coupled to the upper distal end of said first and second front telescopic vertical support members and said first and second rear telescopic vertical support members.

9. A spare tire holder comprising:

a frame support structure adapted to be secured to an underside of a vehicle wherein said frame support structure comprises:

first and second rear telescopic vertical support members in parallel spaced relation, first and second front telescopic vertical support members in parallel spaced relation, a first channel rail guide coupled to said first rear telescopic vertical support member and said first front telescopic vertical support member, a second channel rail guide coupled to said second rear telescopic vertical support member and said second front telescopic vertical support member wherein the first and second channel rail guides are in parallel spaced relation;

a slidable support shelf for securing thereto a spare tire wherein said slidable support shelf is slidably coupled in said first and second channel rail guides;

first and second rear lowering cables journalled through and secured to a bottom end of said first rear telescopic vertical support member and said second rear telescopic vertical support member, respectively;

first and second front lowering cables journalled through and secured to a bottom end of said first front telescopic vertical support member and said second front telescopic vertical support member, respectively; and, a crank assembly having a shaft having wound therearound said first and second rear lowering cables and said first and second front lowering cables wherein when said shaft is rotated in a first direction said first and second rear lowering cables and said first and second front lowering cables are unwound to telescopingly lower said first and second rear telescopic vertical support members and said first and second front telescopic vertical members, simultaneously, to lower said slidable support shelf.

10. The spare tire holder of claim 9, wherein said first front lowering cable and said first roar lowering cable are wound around said shaft in a counter clockwise direction and said second front lowering cable and said second rear lowering cable are wound around said shaft in a clockwise direction wherein, as said shaft is rotated in the clockwise direction, the length of said first and second front lowering cables and said first and second rear lowering cables are unwound and, when said shaft is rotated in the counter clockwise direction, the length of said first and second front lowering cables and said first and second rear lowering cables are wound around said shaft.

11. The spare tire holder of claim 9, wherein each of said first and second front telescopic vertical support members and said first and second rear telescopic vertical support members each comprises:

an upper tubular member couplable to an underside of the vehicle and having art aperture formed in a top end;

a lower tubular member which is telescopingly engaged to said upper tubular member wherein a bottom end of said lower tubular member has coupled thereto a bottom surface; and, an eyelet coupled to an interior side of said bottom surface wherein the eyelet of said first front vertical telescopic support member has coupled thereto said first front lowering cable, the eyelet of said second front vertical telescopic support member has coupled thereto said second front lowering cable, the eyelet of said first rear vertical telescopic support member has coupled thereto said first rear lowering cable, and the eyelet of said second rear vertical telescopic support member has coupled thereto said second rear lowering cable.

12. The spare tire holder of claim 9, wherein said slidable support shelf comprises:

a planar surface aligned in a horizontal plane, a means for securing the spare tire;

at least four wheels coupled to an outer perimeter of said planar surface and which are slidably coupled in said first and second channel rail guides; and, a handle coupled to a rear edge of said planar surface.

13. The spare tire holder of claim 12, wherein said tire securing means comprises:

a threaded shaft perpendicularly coupled in the center of said planar surface; and, a locking member which is threadingly received on said threaded shaft wherein a diameter of an upper portion of said locking member is greater than a diameter of a rim bore of the spare tire.

14. The spare tire holder of claim 9, wherein said frame support structure further comprises:

a front lower horizontal support member coupled perpendicularly to a lower end of said first and second front telescopic vertical support members;

a rear lower horizontal support member coupled perpendicularly to a lower end of said first and second rear telescopic vertical support members;

a first upper horizontal support member coupled to an upper end of said first rear telescopic vertical support member and said first front telescopic vertical support member; and, a second upper horizontal support member coupled to said second rear telescopic vertical support member and said second front telescopic vertical support member wherein said first and second upper horizontal support members are in parallel spaced relation along a horizontal plane.

15. The spare tire holder of claim 9, wherein said frame support structure further comprises a plurality of support brackets wherein a respective one of the plurality of support brackets is coupled to the upper distal end of said first and second front telescopic vertical support members and said first and second rear telescopic vertical support members.

* * * * *